United States Patent
Johnson (10) Patent No.: US 9,313,198 B2
(45) Date of Patent: Apr. 12, 2016

(54) MULTI-FACTOR AUTHENTICATION USING AN AUTHENTICATION DEVICE

(71) Applicant: Oracle International Corporation, Redwood Shores, CA (US)

(72) Inventor: Christopher Johnson, Boston, MA (US)

(73) Assignee: Oracle International Corporation, Redwood Shores, CA (US)

(*) Notice: Subject to any disclaimer, the term of this patent is extended or adjusted under 35 U.S.C. 154(b) by 38 days.

(21) Appl. No.: 13/938,195

(22) Filed: Jul. 9, 2013

(65) Prior Publication Data

US 2014/0298421 A1 Oct. 2, 2014

Related U.S. Application Data

(60) Provisional application No. 61/805,921, filed on Mar. 27, 2013, provisional application No. 61/806,349, filed on Mar. 28, 2013.

(51) Int. Cl.
*H04L 29/06* (2006.01)

(52) U.S. Cl.
CPC .......... *H04L 63/083* (2013.01); *H04L 63/0853* (2013.01); *H04L 63/18* (2013.01); *H04L 2463/082* (2013.01)

(58) Field of Classification Search
CPC ..... H04L 63/08; H04L 63/0853; H04L 63/18; H04L 2463/082
USPC .......................................................... 726/4
See application file for complete search history.

(56) References Cited

U.S. PATENT DOCUMENTS

| | | | |
|---|---|---|---|
| 5,873,735 A * | 2/1999 | Yamada et al. | 434/316 |
| 2006/0156385 A1* | 7/2006 | Chiviendacz et al. | 726/2 |
| 2011/0197267 A1* | 8/2011 | Gravel et al. | 726/5 |
| 2012/0084438 A1* | 4/2012 | Raleigh et al. | 709/224 |
| 2013/0139222 A1* | 5/2013 | Kirillin et al. | 726/4 |

* cited by examiner

*Primary Examiner* — Hadi Armouche
*Assistant Examiner* — Cheng-Feng Huang
(74) *Attorney, Agent, or Firm* — Trellis IP Law Group, PC (57) ABSTRACT

Systems and methods of authenticating users using a possession factor communicate a first authentication code to the user device and a second authentication code to an authentication device that is assumed to be the user's possession. Both authentication codes are presented to the user via their respective devices. An authentication application on the authentication device asks the user to compare the authentication codes and respond, via the authentication device, if these two authentication codes match. Authentication codes may be identical or different and match based on a user association. If a message from the authentication device indicates that the two codes match, then it is confirmed that the user possesses the authentication device and has authorized the authentication to proceed. For enhanced security, the authentication application may optionally be installed and executed on a Subscriber Identity Module (SIM) installed in the authentication device.

19 Claims, 4 Drawing Sheets

MULTI-FACTOR AUTHENTICATION USING AN AUTHENTICATION DEVICE

CROSS REFERENCES TO RELATED APPLICATIONS

This application claims priority from U.S. Provisional Patent Application Ser. No. 61/805,921, entitled AUTHENTICATING A USER OF A WEB SITE VIA A MOBILE PHONE, filed on Mar. 27, 2013, and U.S. Provisional Patent Application Ser. No. 61/806,349, entitled AUTHENTICATING A USER OF A WEB SITE VIA A MOBILE PHONE, filed on Mar. 28, 2013 which is hereby incorporated by reference as if set forth in full in this application for all purposes.

BACKGROUND

The field of the invention is systems and methods for providing multi-factor authentication of a user allowing login on a restricted website, or on an enterprise network with single sign-on, or on various other service systems with security restrictions. The multi-factor approach requires a user to present at least two factors of identification from a set of factors potentially including: (1) a knowledge factor; (2) a possession factor; and (3) an inherence factor. The knowledge factor refers to something the user knows, for instance a pin code or passphrase; the possession factor refers to something the user owns, for instance a security fob, a magnetic card, a cell phone, or a tablet computer; and the inherence factor refers to something the user is. The inherence factor could be determined using biometrics such as fingerprint, iris or voice analysis.

Single-factor authentication for a website or network typically only requires a user to log into an account by providing a username and associated password (knowledge factor only). Since passwords can easily end up in the wrong hands, this approach is not very secure. Therefore, enterprises and high-value web service providers such as banks often require at least a second factor, mostly the possession factor. As such, the mobile phone is becoming more popular, since it is ubiquitous and doesn't require banks to purchase, distribute, maintain and support dedicated hardware. Often in these cases, access to some service would be sought from a user device, which could be a computer, and authentication may involve a user-owned mobile device, which could be a cell phone. In some cases, these might be one and the same device, for instance if access is sought from a smartphone or a tablet computer.

Some websites have a two-factor authentication system that includes a button or link "Login with cell phone". These websites may have a user enter his or her username or cell phone number (or this may be read from a browser cookie stored on the computer used to access the website). If the username or cell phone number is registered in these systems, the website sends an SMS text message to the user with a password that the user is required to manually enter back into the website. The website compares the code it sent to the device with the code the user entered. If they match, the user is considered authenticated and is logged in.

Existing systems have several disadvantages. Although two-factor authentication is used to increase security, most cell phones and tablet computers are very poorly protected against hacking and malware. As a result, malicious parties can devise several strategies to gain unauthorized access by electronic identity theft. These strategies may range from actually or virtually looking over an authorized person's shoulder when this person tries to log in, to installing Trojan horses or phishing software on the portable device, and more. One vulnerability is that an intruder may start access to a protected site in parallel with and slightly before an authorized user, pretending to be this user. The system will then send two messages (SMS or installed app) to the user's device. The user will typically first respond to the first one, unaware that this will grant access to the intruder. The intruder will be in, and the user will be out until he or she has responded to the second message.

Another disadvantage is that manually copying an access code or other information from a user device to a website is considered a nuisance for the user, which many commercial entities want to minimize.

SUMMARY

Embodiments of the invention includes systems and methods of authenticating users using a possession factor. In an embodiment, a user of a user device requests access to a primary service. In response to this access request, a first authentication code is communicated to the user device and a second authentication code is communicated to an authentication device that is assumed to be in possession of the user. Both authentication codes are presented to the user via their respective devices.

An authentication application on the authentication device asks the user to compare the authentication codes and respond, via the authentication device, if these two authentication codes match. Embodiments of the invention may use authentication codes that are identical or that are different and match based on a user association or correspondence. If the authentication device responds with a message indicating that the two codes match, then this embodiment of the invention has confirmed that the authentication device is in possession of the user of the user device and that this user has authorized the authentication to proceed. Embodiments of the invention may then grant the user device access to the primary service or perform further authentication steps, such as requesting a knowledge and/or inherence factor.

An embodiment of the invention utilizes an authentication application installed and executed on a Subscriber Identity Module (SIM) installed in the authentication device. In a further embodiment, only the SIM provider, such as a wireless communications service, is allowed to install the authentication application on the SIM. In yet a further embodiment, only the SIM provider is allowed to communicate directly with the authentication application on the SIM. These embodiments provide enhanced security.

A further understanding of the nature and the advantages of particular embodiments disclosed herein may be realized by reference of the remaining portions of the specification and the attached drawings.

DETAILED DESCRIPTION OF EMBODIMENTS

Figure 1:
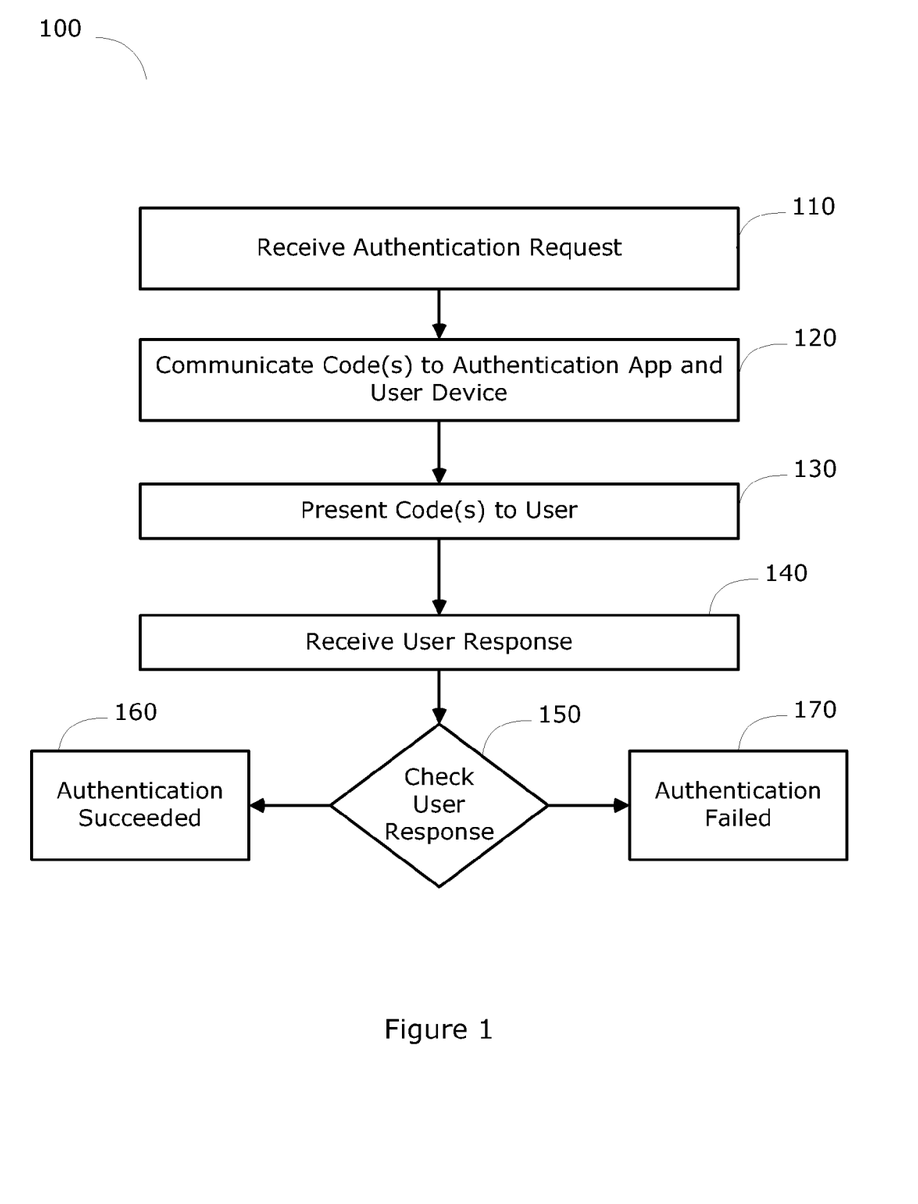
FIG. 1 illustrates a method for authenticating a user of a user device to access a primary service according to an embodiment of the invention.

FIG. 1 shows a method 100 for authenticating a user of a user device to access a primary service according to an embodiment of the invention.

A primary service is any service, system, or resource in which a user must be authenticated to receive access. Examples of primary services include a restricted website, a restricted public or private network, an enterprise network with single sign-on, a payment authorization system, an electronic signature confirmation, an application, a cloud-based application, a web application, a non-web-based Internet application, a software-as-a-service application, a database, peer-to-peer communication, client-server communication, or any other type of system or application where easy and secure authentication of users is of importance.

A user device is the device used by the user to access the primary service may include a terminal, a fixed computer, a desktop computer, a notebook or laptop computer, a tablet computer, a smartphone, a wearable computer, and in general any device that allows human users to access some primary service. A user device may or may not be in possession of the user. Moreover, the primary device does not need to be owned by the user.

The system employed by the primary service to authenticate users will be referred to here as the authentication system. At step 110, an authentication system receives an authentication request for a user. The authentication request may be generated by a primary service in response to being accessed by a user's user device.

At step 120 the authentication system communicates a first authentication code to an authentication application in an authentication device in possession of the user. The authentication device could be a cell phone, a smartphone, a tablet computer, a dedicated electronic device used only for authentication, or any other device that is in possession of the user, capable of presenting audio, visual, or other information, and capable of two-way electronic communication. In further embodiments, the authentication device may include one-way or two-way communications interfaces with one or more communications networks, including the telephone network, cellular data networks, private or virtual private networks, the Internet, and/or any other data network or communication structure.

Embodiments of step 120 may be performed in several ways, including using an SMS message or an Internet message, each of which may be received by the authentication application on the authentication device. In some embodiments, the authentication application may be installed on the authentication device's operating system. In yet other embodiments, an authentication application is embedded into operating system or other built-in software and/or hardware of the authentication device.

In an embodiment, the first authentication code is sent through a telephone carrier's wired and wireless networks to the authentication application that is installed on a Subscriber Identity Module (SIM) card in the authentication device. In this embodiment, the SIM has its own data storage area and processor, and only the wireless telephone carrier has the ability to install and update apps on the SIM, which provides an enhanced level of security against intruders. Further, in embodiments of the invention, only the telephone carrier has the ability to activate SIM-based apps by sending them a message with pertinent data.

In other embodiments, at least part of the authentication application is installed and executed on a SIM, and other parts may be installed and executed in the otherwise more vulnerable area of the device's operating system. In yet other embodiments, the authentication application may use a different storage medium associated with or connected with the authentication device, and the authentication application may not even be installed on the authentication device itself but on an associated or connected device. In further embodiments, the authentication application may be implemented entirely or partially using dedicated hardware.

In a further embodiment, if there are multiple ways of communicating with the authentication device, the most secure method for transmitting the message with the code from the authentication system to the authentication application is chosen. For example, communication via a telephone carrier to a SIM may take precedence over communication through a VPN or other secure channel, which in turn may take precedence over communication via an encrypted message through a non-secure channel.

Additionally, step 120 communicates a second authentication code with the user device. The authentication codes may include a numbers, an alphanumeric string, a word, a phrase, a picture, an animation, a sound or melody, a question, an answer, a vibration, or anything else that is conveniently recognizable for the user. In one embodiment, the first and second authentication codes are identical.

In another embodiment, the first and second authentication codes are different but related. For example, a pair of codes could be a question and an answer; a picture and a missing part; a picture and an associated sound; two picture obviously associated with each other; or any other codes obviously associated or corresponding. Graphics provided on the user device and graphics provided on the authentication device need not be an absolute match. For example, the graphics or animations may have variations in style, and do not need to have a visual match. A human user may be presented with two graphics that merely correlate in a logical, mathematical, visual or other intuitive way. In some embodiments, a noun or name can be presented using letters along with an image of the object to which the noun refers. Two shapes that mate together can be used, variations of an object (e.g., large and small, light and dark, italicized and non-italicized, etc.) can be used and so on. In other embodiments, alphanumeric strings, words, phrases, etc., may have variations in style, color, font, size, etc.

In step 130, the authentication system presents a first authentication code to the user via the user device and the second authentication code to the user via the authentication device. The authentication application on the authentication device asks the user to confirm that the two authentication codes match. For example, a dialog window on the authentication application alerts the user of the intended access to his or her account on the website or network, and asks a question such as "Does this authentication code match the code that you see on your user device?". In this example, two options are given, for instance "Yes" and "No." The user may press or touch a Yes or No button to respond to the authentication request.

In some embodiments, the authentication application may provide response options other than "Yes" and "No." Embodiments of the authentication application may use any other type of user action or input to indicate that the user consents (or not) to the authentication request. For instance, a user inputs such as a gesture, a touch or swipe action, a voice command, an eye command, a face or head movement, or any other type of user input may be used. In further embodiments, the user may be further identified by fingerprint recognition, voice recognition, iris recognition, face recognition, password input, etc.

At step 140 the authentication system receives a message from the authentication device indicating the user's response, or alternatively times out waiting for the user to respond. In an embodiment, this communication back to the authentication system may take the most secure route available, such as via the wireless phone carrier a VPN, or less secure Internet connection if nothing better is available. Again, the data in the communication may be encrypted for security.

At step 150 the authentication system checks the user response. If the user's answer indicated that the two codes matched, then the authentication is accepted, and step 160 notifies the authentication requestor accordingly. In an embodiment, the authentication service sends a message to the primary service indicating that it has confirmed that the user is in possession of the authentication device and has requested that authentication should proceed. At this point, the primary service may elect to provide the user with access to the primary service or conduct further authentication steps, such as requesting a password or biometric information. Conversely, if the authentication application timed out or the user's answer indicated that the two codes did not match, then authentication failed and step 170 notifies the authentication requestor accordingly. In further embodiments, method 100 may be repeated to give the user the option to try again authentication again or to authenticate his or herself different way.

Figure 2:
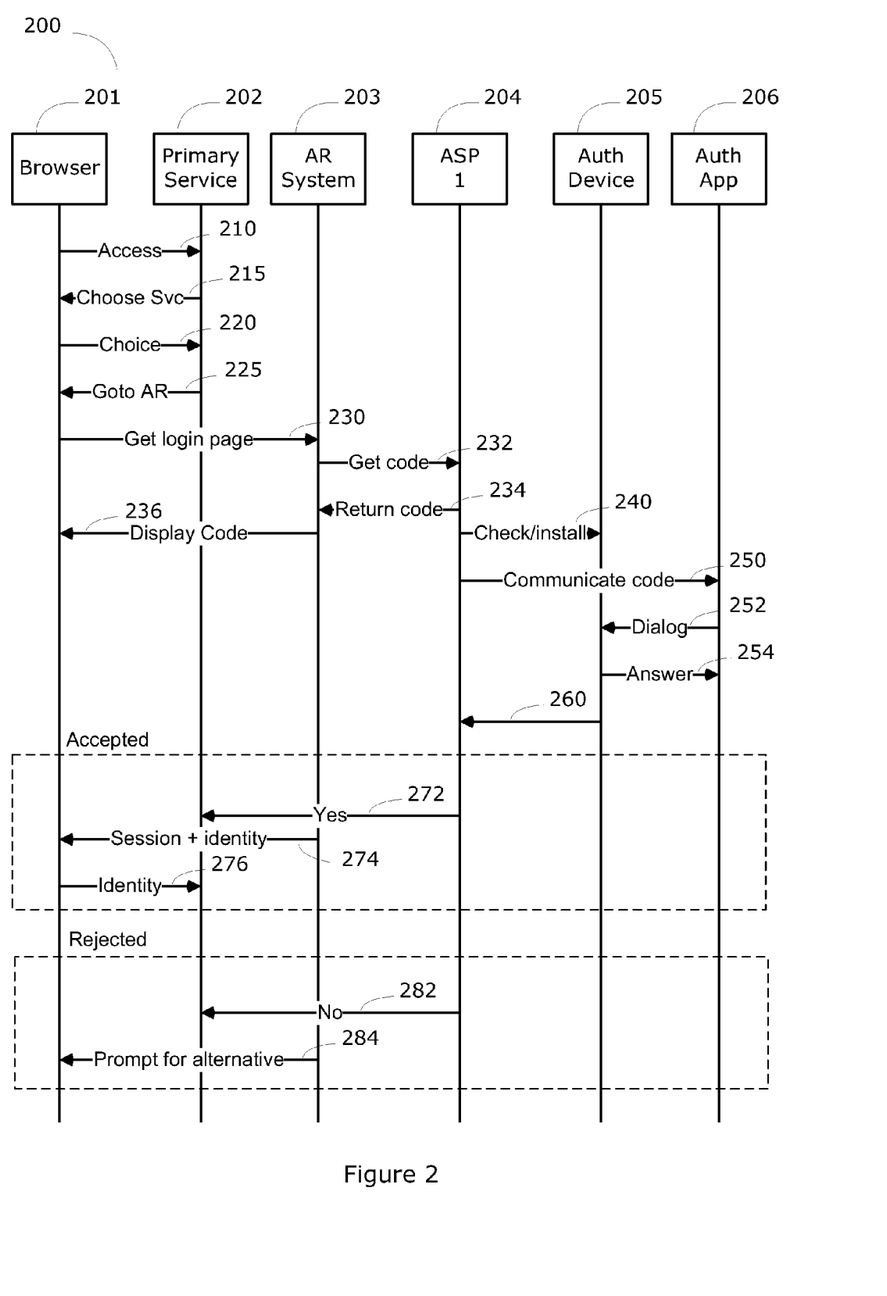
FIG. 2 shows an example message sequence for authenticating a user according to an embodiment of the invention.

FIG. 2 shows an example message sequence 200 for authenticating a user according to an embodiment of the invention. The figure shows a web browser or other application 201 installed on a user device; a web site or other primary service 202 to which the user would like to gain access through a login procedure; an authentication system (AR System) 203 associated with the service 202; an authentication services provider (ASP) 204 which has access to an authentication device 205 owned or effectively owned by the user; and an authentication application 206.

Message 210 communicates a web browser request for access to the website or service 202, which may respond with message 215, requesting that the user, web browser, or application select a particular service provided by the primary service. Message 220 communicates the selection of one of the services from primary service provider. Based on the service selected, message 225 refers the web browser or other application 201 to the appropriate authentication system, such as AR System 203 in this example sequence 200.

In response to message 225, web browser or other application 201 requests a login page from the authentication system 203 and initiates an authentication process using message 230.

Message 232 requests an authentication code from authentication services provider 204, which responds in message 234 by returning a first authorization code.

Message 236 returns the first authentication code to the user's user device for presentation via the web browser or other application 201.

Additionally, the ASP 204 determines if the user's authentication device 205 includes the required authentication application by sending message 240. If not, an embodiment of the invention will automatically install or request that the user manually install the authentication application. In some embodiments this will require user consent, whereas in other embodiments, such as where a wireless services provider has access to a SIM card in the user's mobile device, such consent may not be explicitly required.

In message 250 the authentication services provider communicates the second authentication code to the authentication application 206. This code may be the same as the first authentication code communicated to the user device in messages 234 and 236, or it may be an intuitively matching code.

The authentication application 206 may present a dialog to the user to ask if the two authentication codes match using message 252. Many types of user response are possible, as has been discussed in reference to FIG. 1. The authentication application will interpret the user response (or lack thereof) to mean that access should or should not be authorized, and message 254 communicates this response to the authentication application 206.

Message 260 communicates the authentication response of the user from the authentication application 206 to the ASP 204. If the user has indicated that the two authentication codes match, ASP 204 sends message 272 to AR system 203 to indicate that the authentication should proceed. In an embodiment, message 272 indicates to the AR system 203 that it has confirmed that the user is in possession of the authentication device and that the user has requested that authentication should proceed. At this point, the AR system 203, primary service 202, and the web browser or other application 201 on the user device exchange one or more messages 274 and 276 to complete the authentication and enable user access to the primary service 202.

Conversely, if the user has indicated that the two authentication codes do not match, ASP 204 sends message 282 to AR system 203 to indicate that the authentication should not proceed. At this point, the AR system 203, primary service 202, and the web browser or other application 201 on the user device exchange one or more messages 284 to end the authentication or provide alternative means for authenticating the user.

Figure 3:
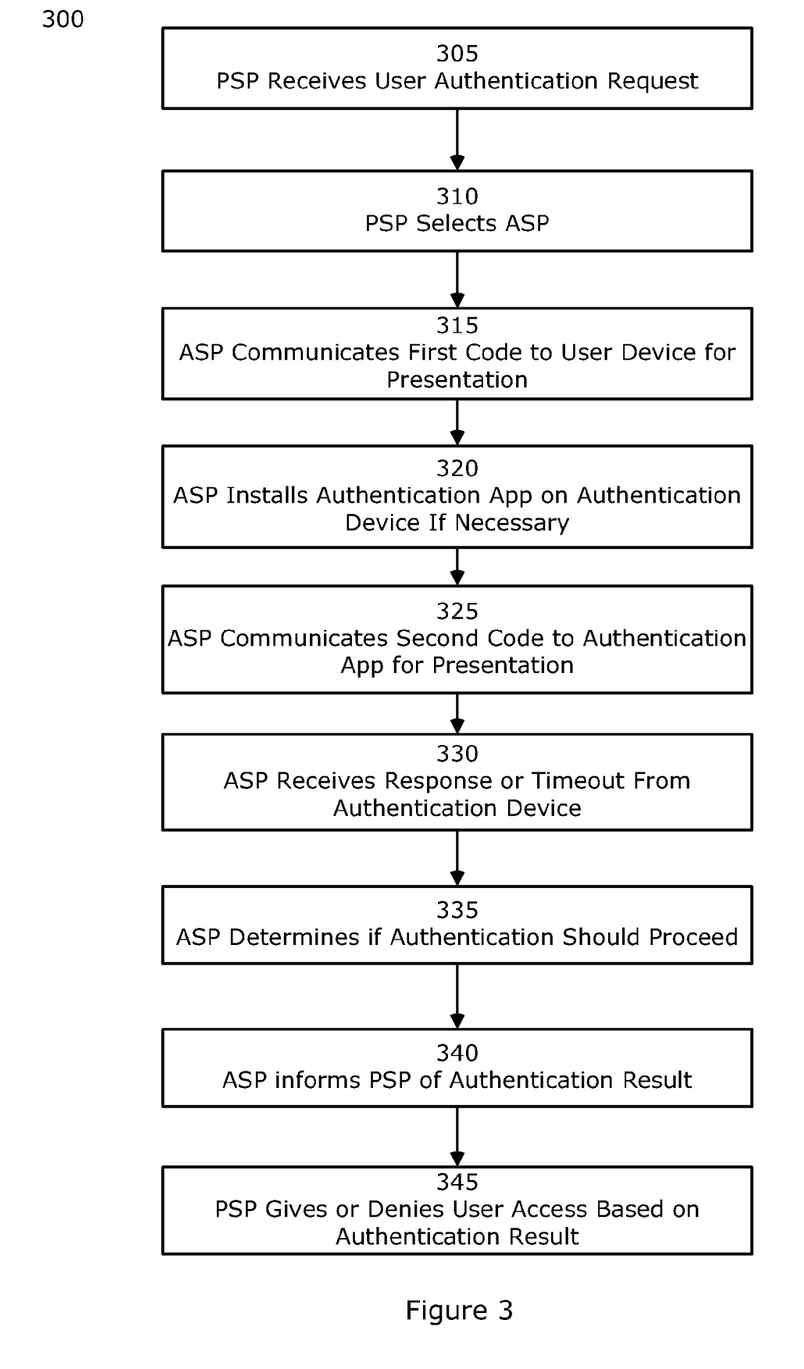
FIG. 3 illustrates a method for authenticating users using an external authentication service according to an embodiment of the invention.

FIG. 3 shows a flow diagram 300 for authenticating users using an external authentication service according to an embodiment of the invention. In step 305, a primary service provider (PSP) receives a user authentication request from a user via the user's device.

In step 310, the PSP selects an authentication service provider (ASP) to assist in the authentication of the user. In an embodiment, the ASP may be a telephone carrier or other party authorized to install, execute, and communicate with applications installed on a SIM card or other restricted environment in a mobile device or any other type of authentication device.

In step 315, the PSP communicates the first authentication code to the user device for presentation to the user.

In step 320, the ASP determines if the user's authentication device includes an appropriate authentication application. If not, then the ASP installs an authentication application on the user's authentication device.

Following step 320, in step 325 the ASP communicates a second authentication code to the authentication application. As described above, the first and second authentication codes may be identical or different but related in some manner.

In step 330, the ASP receives a response from the authentication application in the authentication device or alternatively times out in waiting for a response. As described above, the response from the authentication application may indicate whether the two authentication codes presented by the user device and authentication device match. In step 335, the ASP determines from the response or non-response of the authentication device whether the user, in possession of the authentication device, has indicated that the authentication should proceed.

In step 340, the ASP informs the PSP whether the authentication should proceed or not. In an embodiment, step 340 informs that the PSP that it has confirmed that the user is in possession of the authentication device and has requested that the authentication proceed. In step 345, the PSP gives or denies the user access to the primary service based on the results of the authentication. In further embodiments, the PSP may perform additional actions to authenticate a user, such as requesting a password, biometric verification, or other information from the user, following the receipt of a successful authentication result from the ASP. In these embodiments, the authentication performed by the ASP is a supplement to the security and authentication procedures of the PSP.

Figure 4:
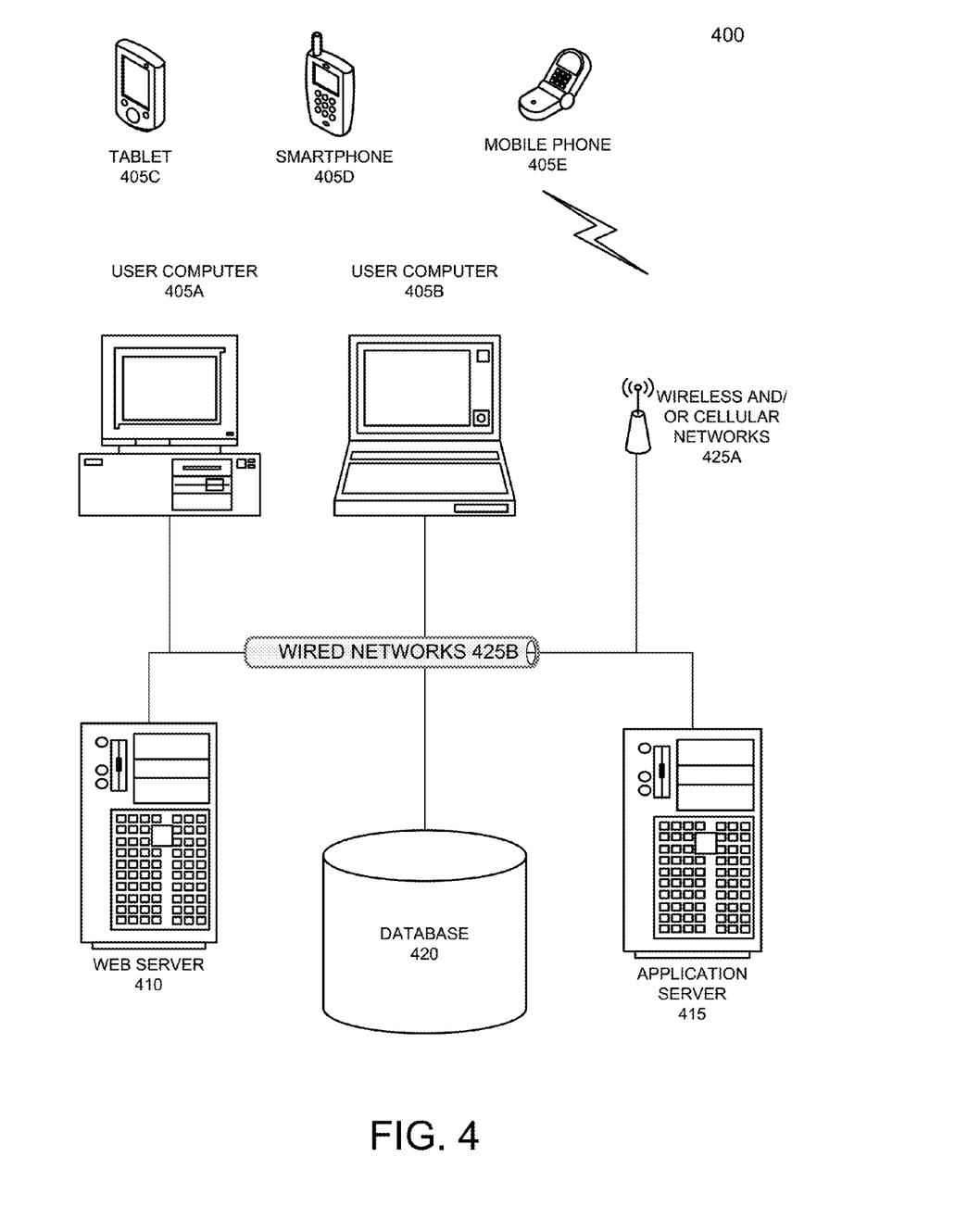
FIG. 4 shows an example computer and network system architecture suitable for implementing embodiments of the invention.

FIG. 4 shows an example computer and network system architecture 400 suitable for implementing embodiments of the invention. The system includes user computers 405 including desktop personal computers 405A, and portable personal computers 405B, tablet computers 405C, smartphones 405D, and mobile phones 405E. The system can interface with any type of electronic device, such as a thin-client computer, Internet-enabled mobile telephone, mobile Internet access device, tablet, electronic book, or personal digital assistant, capable of displaying and navigating web pages or other types of electronic documents. Although the system is shown with five user computers, any number of user computers can be supported. Similarly, even though the system is shown with user computers 405A and 405B connected to web server 410, database 420, and application server 415 through network 425, they may be connected to network 425 indirectly through Internet or any other type of intermediary.

A web server 410 is used to process requests from web browsers and standalone applications for web pages, electronic documents, enterprise data or other content, and other data from the user computers. The web server 410 may also provide the menu application, as well as syndicated content, such as RSS or Atom feeds, of data related to enterprise operations.

Application server 415 operates one or more mobile applications. The mobile applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 415 process input data and user computer requests and can store or retrieve data from database 420. Database 420 stores data created and used by the data applications. In an embodiment, the database 420 is a relational database, such as MySQL, that is adapted to store, update, and retrieve data in response to SQL format commands. In other embodiments, unstructured data storage architectures and NoSQL databases may also be used.

In an embodiment, the application server 415 is one or more general-purpose computers capable of executing programs or scripts. In an embodiment, the web server 410 is implemented as an application running on one or more general-purpose computers. The web server and application server may be combined and executed on the same computers.

An electronic communication network 425 enables communication between user computers 405, web server 410, application server 415, and database 420. In an embodiment, network 425 may further include any form of electrical or optical communication devices, including wireless and/or cellular networks 425A and wired 425B. Network 425 may also incorporate one or more local-area networks, such as an Ethernet network; wide-area networks, such as the Internet and cellular carrier data networks; and virtual networks, such as a virtual private network.

The system is one example for executing mobile applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for authenticating a user of a primary service, comprising:
   receiving an authentication request from a primary service to authenticate a user of a user device;
   communicating a first authentication code to the user device for presentation to the user;
   communicating a second authentication code to an authentication device in the user's possession for presentation to the user, wherein the second authentication code is different than the first authentication code and includes a correspondence with the first authentication code;
   receiving a response message via the authentication device, wherein the response message includes an indication of whether the user has confirmed that the second authentication code corresponds with the first authentication code;
   in response to the response message including an indication that the user has confirmed that the second authentication code corresponds with the first authentication code, communicating an authentication response to the primary service indicating that the user is in possession of the authentication device and has authorized access to the primary service via the user device, wherein the authentication response is communicated when the user has indicated that the two authentication codes match; and
   wherein in response to the response message including an indication that the user has not confirmed that the second authentication code corresponds with the first authentication code, communicating an authentication response to the primary service indicating that the user has not authorized access to the primary service via the user device.

2. The method of claim 1, wherein the first and second authentication codes provide a correspondence that is recognizable by the user.

3. The method of claim 1, wherein an authentication code includes a sound.

4. The method of claim 1, wherein the authentication device includes an authentication application and wherein the authentication application is configured to time out if a predetermined amount of time passes without receiving the user confirmation that the second authentication code corresponds with the first authentication code.

5. The method of claim 4, wherein the authentication application is implemented as a software application.

6. The method of claim 4, wherein the authentication application is stored and executed on a Subscriber Identity Module connected with the authentication device.

7. The method of claim 6, wherein the authentication application is adapted to be installed by a wireless phone carrier associated with the Subscriber Identity Module.

8. The method of claim 6, wherein the second authentication code is communicated to the authentication device via a communications channel controlled by the wireless phone carrier associated with the Subscriber Identity Module.

9. The method of claim 6, wherein the response message is received via a communication channel controlled by the wireless phone carrier associated with the Subscriber Identity Module.

10. One or more non-transitory tangible media including instructions adapted to direct a processor to perform a series of operations, the operations comprising:
    receiving an authentication request from a primary service to authenticate a user of a user device;
    communicating a first authentication code to the user device for presentation to the user;
    communicating a second authentication code to an authentication device in the user's possession for presentation to the user, wherein the second authentication code is different than the first authentication code and includes a correspondence with the first authentication code;
    receiving a response message via the authentication device, wherein the response message includes an indication of whether the user has confirmed that the second authentication code corresponds with the first authentication code;
    in response to the response message including an indication that the user has confirmed that the second authentication code corresponds with the first authentication code, communicating an authentication response to the primary service indicating that the user is in possession of the authentication device and has authorized access to the primary service via the user device, wherein the authentication response is communicated when the user has indicated that the two authentication codes match; and
    wherein in response to the response message including an indication that the user has not confirmed that the second authentication code corresponds with the first authentication code, communicating an authentication response to the primary service indicating that the user has not authorized access to the primary service via the user device.

11. An apparatus for authenticating a user of a primary service, the apparatus comprising:
    one or more processors;
    one or more non-transitory tangible media including instructions executable by the one or more processors for:
    receiving an authentication request from a primary service to authenticate a user of a user device;
    communicating a first authentication code to the user device for presentation to the user;
    communicating a second authentication code to an authentication device in the user's possession for presentation to the user, wherein the second authentication code is different than the first authentication code and includes a correspondence with the first authentication code;
    receiving a response message via the authentication device, wherein the response message includes an indication of whether the user has confirmed that the second authentication code corresponds with the first authentication code;
    in response to the response message including an indication that the user has confirmed that the second authentication code corresponds with the first authentication code, communicating an authentication response to the primary service indicating that the user is in possession of the authentication device and has authorized access to the primary service via the user device, wherein the authentication response is communicated when the user has indicated that the two authentication codes match; and
    wherein in response to the response message including an indication that the user has not confirmed that the second authentication code corresponds with the first authentication code, communicating an authentication response to the primary service indicating that the user has not authorized access to the primary service via the user device.

12. The apparatus of claim 11, wherein the first and second authentication codes provide a correspondence that is recognizable by the user.

13. The apparatus of claim 11, wherein an authentication code includes a sound.

14. The apparatus of claim 11, wherein the authentication device includes an authentication application and wherein the authentication application is configured to time out if a predetermined amount of time passes without receiving the user confirmation that the second authentication code corresponds with the first authentication code.

15. The apparatus of claim 14, wherein the authentication application is implemented as a software application.

16. The apparatus of claim 14, wherein the authentication application is stored and executed on a Subscriber Identity Module connected with the authentication device.

17. The apparatus of claim 16, wherein the authentication application is adapted to be installed by a wireless phone carrier associated with the Subscriber Identity Module.

18. The apparatus of claim 16, wherein the second authentication code is communicated to the authentication device via a communications channel controlled by the wireless phone carrier associated with the Subscriber Identity Module.

19. The apparatus of claim 16, wherein the response message is received via a communication channel controlled by the wireless phone carrier associated with the Subscriber Identity Module.

* * * * *